Feb. 15, 1927. 1,617,557
A. J. WEATHERHEAD, JR
HANDLE AND METHOD OF MAKING SAME
Filed Oct. 27, 1926

Inventor
A. J. WEATHERHEAD Jr.

By *Fisher, Moser & Moore*
Attorney

Patented Feb. 15, 1927.

1,617,557

UNITED STATES PATENT OFFICE.

ALBERT J. WEATHERHEAD, JR., OF CLEVELAND, OHIO.

HANDLE AND METHOD OF MAKING SAME.

Application filed October 27, 1926. Serial No. 144,624.

My invention relates to an improvement in handles and a method of making the same, especially a handle for a valve stem or other part adapted to be turned or manipulated by hand. In general my object is to produce a ring-shaped handle in a facile and inexpensive way by the steps hereinafter described and more particularly pointed out in the claims.

Figure 1:
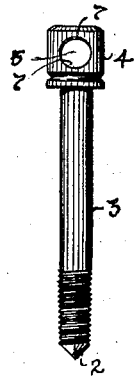
Figure 2:
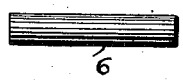
Figure 3:
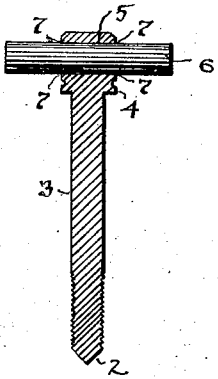
Figure 4:
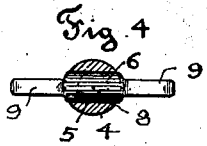
Figure 5:
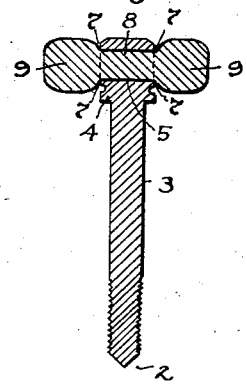
Figure 6:
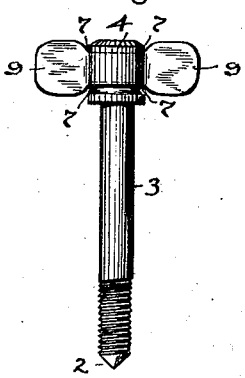
Figure 7:
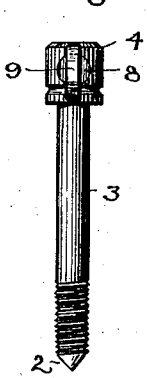

In the annexed drawings, Fig. 1 is a side elevation of a valve stem having an enlarged head with a cross bore therein, and Fig. 2 is a side view of a round rod adapted to be inserted within said bore. Fig. 3 is a sectional view of the valve stem showing the rod as it appears when first introduced in the bore. Fig. 4 is a cross section of the head showing the protruding portion of the rod flattened, and Fig. 5 is a vertical section through the stem and the rod as these parts appear united together when the protruding portions of the rod have been flattened and expanded vertically. Fig. 6 is a side elevation of the completed stem and handle, and Fig. 7 is an edge elevation thereof.

The invention comprises a main body part, which in the present instance consists of a round needle valve 2 having a round stem 3 formed with a round enlargement or head 4 at its upper or outer end in which a round opening 5 is drilled from side to side at right angles to the axis of the head and stem. This part may be made quickly and cheaply in an automatic screw machine, but lacks means to permit it to be gripped and turned by hand. Such means may be provided by inserting a round rod 6 of predetermined diameter and length within the opening or cross bore 5, for example, as delineated in Fig. 3. A body part and handle member so constructed may not be particularly novel, but by taking the following simple steps a very rigid union of the parts is effected, and a flat wing-shaped handle is produced which permits a rotatable movement to be imparted by hand with a firm grip and without distress to the fingers.

Thus, a rod 6 is cut to a given length and the ends are cut straight at right angles to the axis of the rod. This piece is then inserted to about its middle in cross bore 5 so that the end portions protrude approximately equal distances on opposite sides of head 4. The protruding end portions, which are round, are then subjected to pressure simultaneously at each side of the head and flattened thus reducing the thickness of the stock to about one-half the diameter of the central part of the rod which occupies the opening in head 4. This flattening operation may be produced by dies constructed to apply equal pressure simultaneously over equal areas on opposite sides of head 4, and closely contiguous to the circumference of the head. This operation not only flattens the round rod but it also displaces the stock directly involved, causing it to flow or expand in opposite directions longitudinally of the head thereby widening the protruding ends of the rod as well as flattening the same. The pressure being localized contiguous to and parallel with the straight sides of the head the stock which is flattened crowds into the sharp round corner edges 7—7 at the opposite ends of round cross bore 5, only a segmental part of the circular edge at the top and bottom of the cross bore being involved. The stock under compression also tends to crowd toward the center of head 4 when both ends of the rod are compressed simultaneously, thereby swelling the round central portion 8 of the rod within the round opening in the head. In this way round part 8 of the rod becomes wedged within the head and the flat wings 9 are crowded into interlocking engagement with the sharp corner edges 7 so that the rod cannot turn on its own axis or work free longitudinally of its axis. In fact the completed handle is so tightly fixed within the head and the joints so neatly finished that it appears on casual inspection to be an integral part of the head.

What I claim is:

1. A handle, comprising a member having a cross piece extending therethrough, said cross piece being compressed to thinner and wider dimensions and interlocked with said member at each side thereof.

2. A handle comprising a main body part having a transverse opening therein, and a rod extending through the opposite ends of said opening, the protruding portion of said rod being flattened and expanded in locking union with the border edges of the opposite ends of said opening.

3. A handle, comprising a main body part having a round opening transversely therethrough, and a round rod extending through both ends of said opening and having the projecting portion flattened and widened to provide a pair of combined gripping wings and locking elements for said rod.

4. A handle, comprising a stem having an enlargement formed with a cross bore, and a round rod extending through said bore having its opposite extremities reduced in thickness and flattened to wider dimensions to provide finger-grips, the edges of said flattened extremities being wedged in interlocking union with said head at their juncture with the circular end edges of said opening.

5. A method of producing a handle, comprising the step of compressing the opposite ends of a cross piece at each side of a main member through which said cross piece extends and forming a pair of flattened wings while simultaneously interlocking said parts together at their lines of juncture.

6. A method of producing a handle, comprising the steps of forming a cross bore within one part, inserting a second part within said cross bore and centering the same to provide protruding portions of substantially equal length on opposite sides of said first part, and then compressing both protruding portions simultaneously to a lesser thickness and wider dimensions than the central portion and crowding the stock into opposite ends of said cross bore and into interlocking union with the end edges thereof.

7. A method of producing a handle consisting in assembling two pieces of metal at right angles by inserting one through an opening in the other and then compressing and flattening the protruding end of the inserted piece closely contiguous to the side of the body of the other piece and crowding part of the stock under compression into the opening to swell and lock said part therein.

In testimony whereof I affix my signature.

ALBERT J. WEATHERHEAD, Jr.